Feb. 12, 1957 A. K. FERRARA ET AL 2,781,432
DEPLETION ALARM
Filed June 30, 1954
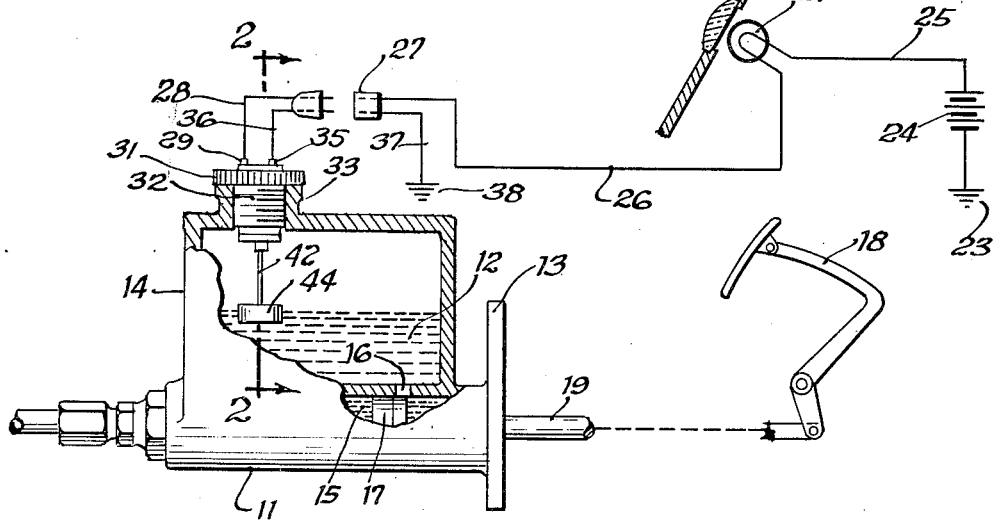
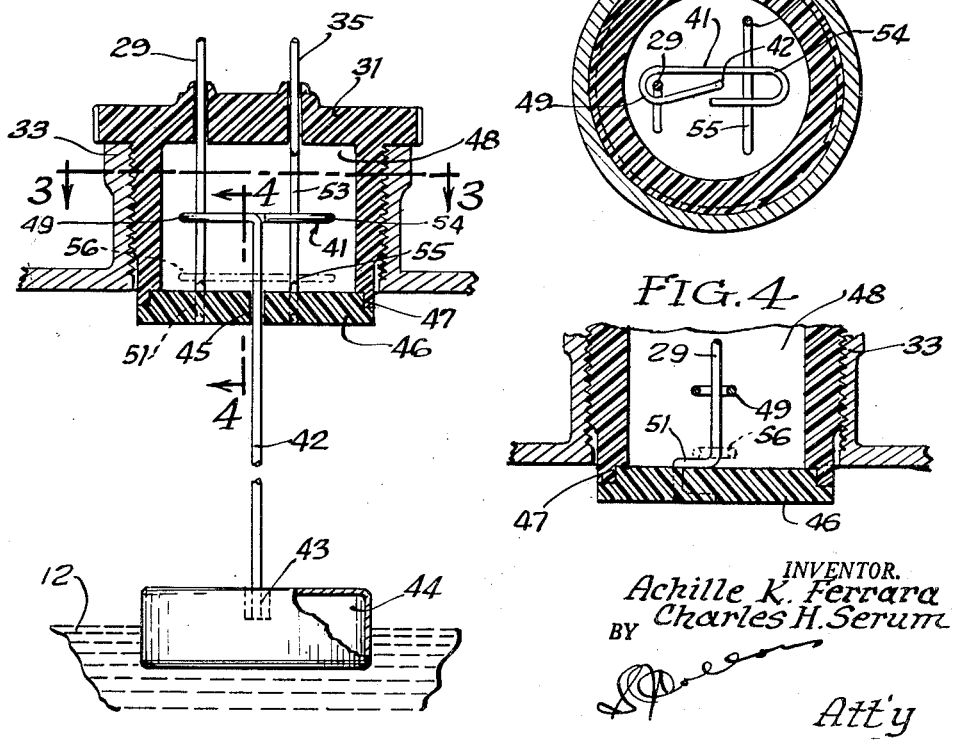
INVENTOR.
Achille K. Ferrara
BY Charles H. Serum
Att'y

2,781,432
DEPLETION ALARM

Achille Kelly Ferrara, Elmwood Park, and
Charles H. Serum, Chicago, Ill.

Application June 30, 1954, Serial No. 440,386

4 Claims. (Cl. 200—84)

The present invention relates to automobile hydraulic brake systems and concerns itself more particularly with an electrically operated alarm device for apprising the vehicle operator of the fact that the brake system fluid is depleted below the safety level.

The invention concerns itself with the provision of such alarm implementation which may be manufactured economically so as to be salable at small cost while nevertheless providing an adequately rugged and durable operating mechanism in respect to its moving parts to withstand exposure and the usual rigors of automobile accessories.

The principal object of the present invention therefore is one of providing an accessory of the described class having small dimensions in respect to its float and operating switch components so that the attachment thereof to a conventional motor vehicle brake system will constitute a simple and compatible operation.

A further object of the present invention is to provide an alarm indicating device of this class which may be manufactured into a rugged serviceable unit at low cost so as to be attractive to widespread distribution and to be adaptable to different brake system structures universally.

A further object of the present invention is to devise an electrically controlled signal alarm apparatus for denoting brake fluid depletion which will have a minimum of moving parts and which will respond in the event of the contingency even though exposed over long periods of time to a trouble-free condition during which its alarm facilities may remain dormant.

For a better understanding of the foregoing and other objects of this invention reference will now be had to the accompanying drawings and to the following detailed description, in both of which like reference numerals designate corresponding parts throughout and in which:

Fig. 1 is a diagrammatic circuit illustration featuring fragmentary portions of an automobile and its brake system with the present invention applied;

Fig. 2 is an enlarged detailed sectional view taken approximately on line 2—2 of Fig. 1;

Fig. 3 is a transverse sectional view taken approximately on line 3—3 of Fig. 2; and Fig. 4 is an enlarged fragmentary sectional view taken approximately on line 4—4 of Fig. 2.

In Fig. 1 of the accompanying drawings, the reference numeral 11 designates a master cylinder of a hydraulic brake system such as is conventional in motor vehicles and such as usually includes four tributary cylinders, each for operating one of the wheel brake shoes to effect frictional arrest of locomotion.

When the fluid 12 in such brake systems becomes sufficiently depleted to incur the hazard of admitting atmosphere, the effectiveness of the brake system may become seriously impaired with the consequence of total loss of control of the principal braking action and consequently invoking a serious hazard to public safety. Many factors are involved which might lead to total brake failure, and frequently the failure conditions may come upon a braking system without warning to the operator so that the first manifestation of the failure comes too late to avoid serious consequences.

The principal or master cylinder 11 is usually provided with a mounting plate located at one end as at 13, or sometimes at one side (not shown), affording to this organ relative stability in respect to the automobile chassis. A reservoir housing 14 contains a supply of brake fluid 12 which may enter into the piston chamber 15 through an orifice 16 when the piston 17 is retracted. During the time that the brake pedal 18 is under actuation, the piston rod 19 being thereby thrust leftwardly as viewed in Fig. 1, communication through the orifice 16 is cut off so that the effective fluid is then placed under pressure by the action of the piston 17 and disassociated from the reservoir supply 12.

Failure contingencies more often than not are due to leakage at outlying parts of the system, such as at one of the brake cylinders or in one of the flexible hose connections leading thereto. For this reason the development of a leak may not result in the depression of the fluid level 12 until the vehicle is placed in motion or in some cases until after the brake system has been actuated several times.

Under such conditions a failure may produce an operating signal such as material variation in the stroke of the pedal 18. Under other cases, however, the fluid may leak directly out of the entire system and produce a total failure under the very first operating attempt and may come about under emergency conditions. It is therefore the purpose to sense for fluid depression and to warn the operator as by illuminating electric signal lamp 21 located in the dashboard 22 of the contingency of brake failure due to fluid depletion.

The operation of signal lamp 21 is effected over an obvious circuit which may be traced from ground at 23, battery 24, lines 25 and 26, severable connector plug 27 and its contact terminals, line 28 to a wire conducting element 29 which will be observed from Figs. 2 and 3 to enter through the head 31 of a cap screw replacement housing member 32, Fig. 1, which is threaded to fit the internal threads of a vertical collar portion 33 customary in reservoir constructions.

The circuit which was traced to the terminal element 29 will be picked up at this point at the opposite terminal element 35 which connects over wire 36 with the severable plug 27, thence continuing over line 37 to ground at 38. Severable connector 27 is provided in order to facilitate the installation of this instrumentality without subjecting the line wires to twisting as the housing plug 32 is installed. In order to complete the aforedescribed circuit electrical conductivity requires to be bridged across the conducting elements 29 and 35, and this is accomplished by the action of a bilateral loop 41 which in the instant embodiment may be formed from a single wire element which includes a vertical stem 42 that is secured as at 43 in the float element 44 and which passes through a central aperture 45 in the center portion of a closure plate or cap 46.

Cap 46, like the replacement housing 32, requires to be made of electrically nonconductive material. It is preferably shouldered so as to fit in to the recessed portion 47 of the housing extremity, thereby encompassing the interior chamber 48 and shielding this environment against invasion which might otherwise ultimately result in contact failure. The terminal conducting element wires 29 and 35 resemble and differ from each other as will now be explained.

Wire 29 enters the cap at a diametrically median position as best indicated in Fig. 3 and extends in a perpendicular direction through the principal vertical distance of chamber 48, as best indicated in Fig. 4, where it is encircled by the loop 49 of bilateral formation 41. Near the bottom element 29 is doubled over as at 51 to bed itself in the cap or disc element 46.

In contrast, conducting element 35 enters the space 48 at a displaced area as designated 52 in Fig. 3 so as to be clear of engagement with the opposite but balancing loop formation 54 throughout the major portion of its travel, but providing nevertheless a contacting surface as at 55, see also Fig. 2, which may be engaged by the loop portion 54 in the event that the float 44 ranges low enough to permit the formed assembly 41 to reach the level in which it is shown by the dotted outline 56 in Fig. 2.

It is to be noted that the stem portion 42 extending from the float 44 is loosely chambered in the opening 45 and that the engagement of guide loop 49 around wire 29 are both of such loose-fitting noncritical extent that the response of the float to the surface level of fluid 12 will not be impaired even over years of inactivity, such as might otherwise be brought about in the interfitting relationship of machined parts and even of bearing journals. Thus not only is the apparatus possessed of outstanding simplicity and manufacturing economies, but in its very rudimentary simplicity it obtains a unique feature of reliability.

While the present invention has been explained and described with reference to various specific structural contemplations, it will be understood nevertheless that numerous changes and modifications are susceptible to being made without departing from the patentable scope thereof.

The invention claimed is:

1. A float-operated fluid level indicator apparatus for hydraulic brake systems which comprises a housing body adapted to replace the reservoir cap plug of a master cylinder brake fluid reservoir, said body including a threaded portion for engaging the threads of a vertically upstanding reservoir collar and having a hollow interior, a closure disc for covering the housing body hollow interior, a float element, a formed wire member carrying at a lower end of said float element and formed at its upper end into bilateral loops of substantially balanced mass, and an operating electric circuit including a first formed-wire conducting element extending into said housing body and having a perpendicular section around which one of the formed-wire member bilateral loops passes, a portion of said first conducting element passing through said closure disc and presenting a contact surface for electrically engaging a related part of the bilateral loop, and a second formed-wire conducting element extending into said housing body including a portion deformed to avoid engagement with its related part of said bilateral loop, and a portion of said second formed-wire conducting element passing through said closure disc and disposed in the path of the related bilateral loop.

2. A depletion alarm device for hydraulic brake systems which comprises a housing unit for engaging the threads of a vertical reservoir collar and having a hollow interior, a disc for covering the interior, a float element, a formed-wire carrying said float element and including uppermost bilateral loops, an electric circuit including a conducting element extending into said housing body and having a perpendicular section which serves as a guide to one of said bilateral loops, a further portion of said conducting element presenting a contact surface at the level of said disc for electrically engaging its bilateral loop, and a further conducting element extending into said housing body including a portion deformed to avoid engagement with the other of said bilateral loops and terminating with a contact extremity corresponding to that of said first mentioned conducting element but disposed in the path of the other bilateral loop to thereby complete the circuit.

3. A fluid-level indicator for automobile hydraulic brake systems which comprises, a float element suspended from a guide wire adapted to range in accordance with the surface level of a master cylinder fluid supply, and a housing body adapted to replace the conventional filler plug cap of the reservoir housing, said float element including a wire rod extending from the housing body in a vertical direction and having at its upper level balanced bilateral loop formations residing within said housing body, a pair of conducting elements adapted to be bridged by said bilateral float element wire portion including a first element having an intermediate section passing through one of the bilateral loops to serve as a guide and presenting a contact surface at the lower extremity of the housing body, and a second element including a displaced intermediate portion for avoiding engagement with the other of said bilateral loops but correspondingly terminating with a contact surface to engage said other of said bilateral loops when the float element is depressed as a consequence of hydraulic fluid depletion.

4. A fluid level depletion alarm for hydraulic brake systems which comprises, a float element suspended from a guide wire adapted to range in accordance with the surface level of the brake fluid in a master cylinder, and a housing body housing a hollow interior, said float element including a wire rod extending in a vertical direction into the body hollow interior and terminating at its upper level with balanced bilateral loop formations, a pair of conducting elements adapted to be bridged by said bilateral float element wire portion including a first element passing through one of the bilateral loops to serve as a guide as well as a contact surface, a second conducting element including a displaced intermediate portion for avoiding engagement with the other of said bilateral loops but terminating with a contact surface to engage said other of said bilateral loops.

References Cited in the file of this patent

UNITED STATES PATENTS

| | | |
|---|---|---|
| 1,661,054 | Snyder et al. | Feb. 28, 1928 |
| 2,085,173 | Stansbury | June 29, 1937 |
| 2,613,293 | Marks | Oct. 7, 1952 |
| 2,684,414 | Kilpatrick | July 20, 1954 |